United States Patent
Käppeler et al.

(10) Patent No.: US 6,214,072 B1
(45) Date of Patent: *Apr. 10, 2001

(54) CERAMIC COATED FILTER MEDIUM AND INTERNAL SUPPORT

(75) Inventors: Gerhard Käppeler, Bergisch Gladbach; Wolfgang Peukert, Rösrath; Mike Schmitt, Hennef, all of (DE)

(73) Assignee: Menardi Mikropul, LLC, Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,243

(22) Filed: Apr. 17, 1998

(51) Int. Cl.$^7$ .............................. B01D 29/15; B01D 46/02
(52) U.S. Cl. ................................ 55/379; 55/302; 55/496; 55/523
(58) Field of Search ..................... 55/379, 496, 523, 55/524, 341.1, 341.2

(56) References Cited

U.S. PATENT DOCUMENTS

| | | |
|---|---|---|
| 1,735,007 | 11/1929 | Lanes . |
| 3,401,505 * | 9/1968 | Ballard ............................... 55/379 X |
| 3,680,285 | 8/1972 | Wellan et al. ........................... 55/302 |
| 3,747,307 * | 7/1973 | Peshina et al. .......................... 55/379 |
| 3,826,067 | 7/1974 | Wilder et al. ........................... 55/524 |
| 3,997,305 | 12/1976 | Ulvestad et al. .................... 55/341 R |
| 4,102,785 | 7/1978 | Head et al. ............................. 210/65 |
| 4,149,863 | 4/1979 | Ballard ................................... 55/379 |
| 4,150,959 | 4/1979 | Bielak .................................... 55/341 |
| 4,157,901 * | 6/1979 | Schaltenbrand .................... 55/379 X |
| 4,194,894 * | 3/1980 | Noland .................................. 55/379 |
| 4,243,715 | 1/1981 | Gordon ................................ 428/263 |
| 4,270,935 | 6/1981 | Reinauer ................................ 55/379 |
| 4,293,111 | 10/1981 | Henri ..................................... 248/95 |
| 4,306,893 | 12/1981 | Fernando et al. ....................... 55/302 |
| 4,358,371 | 11/1982 | Jameson et al. ...................... 210/415 |
| 4,364,758 | 12/1982 | Clements et al. ....................... 55/365 |
| 4,376,675 | 3/1983 | Perrotta ................................ 162/145 |
| 4,659,610 | 4/1987 | George et al. ........................ 428/198 |
| 4,732,879 | 3/1988 | Kalinowski et al. ..................... 502/5 |
| 4,970,097 | 11/1990 | Kalinowski ....................... 427/376.2 |
| 5,198,006 | 3/1993 | Mimori et al. .......................... 55/523 |
| 5,202,021 | 4/1993 | Griffin et al. ......................... 210/232 |
| 5,308,369 | 5/1994 | Morton et al. .......................... 55/379 |
| 5,308,485 | 5/1994 | Griffin et al. ......................... 210/232 |
| 5,316,407 | 5/1994 | Miller ................................... 404/25 |
| 5,322,537 | 6/1994 | Nakamura et al. ..................... 55/523 |
| 5,380,580 | 1/1995 | Rogers et al. ........................ 428/219 |
| 5,453,116 | 9/1995 | Fischer et al. .......................... 95/278 |
| 5,705,444 | 1/1998 | Tompkins et al. ...................... 442/76 |
| 5,824,125 * | 10/1998 | Sherwood .......................... 55/496 X |

FOREIGN PATENT DOCUMENTS

| | | |
|---|---|---|
| 30 45 759 | 6/1982 | (DE) . |
| 0204399 * | 11/1983 | (DE) ................................... 55/379 |
| 0228455 * | 10/1985 | (DE) ................................... 55/379 |
| 0 088 148 | 9/1983 | (EP) . |
| 0 733 392 | 9/1996 | (EP) . |
| 1023083 * | 3/1966 | (GB) ................................... 55/379 |
| 6-170136 * | 6/1994 | (JP) ..................................... 55/379 |
| 1109182 * | 8/1984 | (SU) .................................... 55/379 |

OTHER PUBLICATIONS

Lufthansa–Magazine, Published Mar./Apr. 1993—pp. 48–47, titled "The Power of Particles" (Die Macht des Materials).

* cited by examiner

Primary Examiner—Robert H. Spitzer
(74) Attorney, Agent, or Firm—Kennedy Covington Lobdell & Hickman, L.L.P.

(57) ABSTRACT

A filter comprising (i) a filter bag formed of a filter medium comprising glass fibers, the fibers being fixed to one another at crossover points by a ceramic binder coating, and (ii) a transversely adjustable support member to which the filter medium is fixed. This invention also relates to a method of filtering a gas stream using such a filter and support member arrangement

14 Claims, 1 Drawing Sheet

CERAMIC COATED FILTER MEDIUM AND INTERNAL SUPPORT

BACKGROUND OF THE INVENTION

1. Field of the Invention

This invention generally relates to elongated bag-like tubular filters ("filter bags") for filtering particulate material carried in a gas or liquid stream in a filter housing and, more particularly, relates to a ceramic coated filter medium and internal support for use in gas filtration.

2. Related Background Art

Filter bags are typically mounted in filter housings or in a baghouse with supporting frames or cages positioned therein to hold the filter bags in an open, hollow tubular configuration. The bags are open at an outlet end and closed at the other end. Particulate-laden gas or liquid is directed into the baghouse and through the gas-permeable filter bags. The particulate material is filtered and retained on the exterior surface of the filter bags while the filtered gas passes through the filter bag. Periodically, a reverse purge of gas or fluid is directed into the open outlet end of the filter bags for dislodging any trapped particulate material from the bags and thus, cleaning the filter bags. Hence, filter media must be able to withstand not only the normal conditions of gas filtration, but also the periodic cleaning process to which they will be subjected.

The temperatures at which gas filtration is conducted are greatly limited by the properties of the filter media employed. Synthetic filter media typically have insufficient heat resistance beyond approximately 250° C. At temperatures above 250° C., loss of mechanical strength and/or thermal decomposition is observed with such conventional synthetic filter media. For temperatures up to about 300° C., woven or non-woven glass can be used. However, filters of glass fibers are often brittle and do not withstand the mechanical stress associated with typical baghouse operations. For temperatures above 300° C., metallic filter media may be utilized. However, due to their very high price and limited corrosion resistance, the field of application for metallic filter media is very limited. Vacuum formed fiber ceramics or sintered grain ceramics are also available. However, due to the limited filter area per ceramic filter element, substantially more space is required for the total filter, thereby resulting in elevated cost.

Hence, there is great industrial demand for inexpensive, compact filtration equipment operational within a high-temperature range of about 300° C. to about 500° C. or even as high as 700° C. or higher. Glass fibers are an attractive filter media in this temperature range due to their desirable physical and chemical properties and low cost. However, as described previously, the use of glass fiber based filter media is limited by the brittleness of the media which results in fiber breakage due to friction and bending during use.

To reduce friction between the glass fibers, the art has suggested applying various coatings, such as silicon, starch, graphite and PTFE to glass fibers. However, above 300° C., these coatings degrade, thus resulting in the loss of fiber protection and therefore, rapid destruction of the filter media.

Therefore, for economical and process reasons, a need exists for a filter medium operational at temperatures above about 300° C., exhibiting good chemical resistance, long lifetime, a larger filter area per element, and an attractive price.

SUMMARY OF THE INVENTION

In the filter media of the present invention, individual fibers of woven or non-woven glass or mineral are fixed at the fiber crossover points through coating with organic-inorganic or inorganic binders. Breakage at the fiber crossover points is avoided by substantially eliminating movement of the filter medium through the use of a support. The support is desirably dimensionally adjustable (e.g., transversely adjustable) to provide a close fit between the filter medium and the support.

The present invention provides for high-temperature (e.g., above about 300° C. to at least about 500° C. or even as high as about 700° C.) filter media of ceramic coated woven or non-woven glass fibers with optimal filtration properties, such as filter rate and dust-collecting efficiency and without significant pressure drop. This is accomplished by coating the glass fibers with an organic-inorganic or inorganic binder to effect fixation of the fibers at the crossover points. Additionally, through the use of a special support member, breakage of the fixed crossover points, both as a result of the normal conditions of gas filtration and as a result of periodic cleaning processes, is eliminated. Thus, the filter medium of the present invention results in good operation in the temperature range of about 300° C. to at least about 500° C. (or even as high as about 700° C.) and exhibits good chemical resistance, long lifetime, a larger filter area per element (e.g., 1–2 $m^2$/element) and an attractive price.

Accordingly, in a first aspect, this invention is directed to a filter comprising a filter bag formed of a filter medium comprising glass fibers, the fibers being fixed to one another at crossover points by a ceramic binder coating. This invention is also directed to such a filter medium wherein the filter medium is fixed on a dimensionally adjustable (i.e., transversely adjustable) support member.

Preferably, the glass fibers suitable for use in the present invention include materials such as glass, ceramic minerals, and a mixture thereof.

In the preferred embodiment of the present invention, the filter medium operates at temperatures up to about 700° C.

In yet another preferred embodiment, the filter medium weighs from about 100 $g/m^2$ to about 2000 $g/m^2$.

Preferably, the binder coating is an organic-inorganic or inorganic substance.

In another preferred embodiment of the present invention, the binder comprises $SiO_2$, $Al_2O_3ZrO_2$, $TiO_2$, $SiO_2/TiO_2$, $SiO_2/ZrO_2$, $B_2O_3/SiO_2$, $Na_2O/B_2O_3/SiO_2$ or $Na_2O/Al_2O_3/B_2O_3/SiO_2$ composites.

In yet another preferred embodiment, the binder composition is applied to the filter medium by dipping, rolling or spraying.

In the preferred embodiment of the present invention, the support member is dimensionally adjustable by being transversely adjustable. A suitable support member may comprise a cylindrical metal support comprising metal wires, slotted support rings, spacers, and V- or U-shaped rails. For example, the support member may have a circumference which can be fixed in position by spacers guided in parallel or conically arranged V-shaped or U-shaped guiding rails.

This invention is also directed to a method of filtering a gas stream, comprising the steps of providing a support member being transversely adjustable, supporting, by the support member, a filter medium comprising glass fibers, wherein the fibers are fixed to one another at crossover points by a ceramic binder which is applied to the filter medium, and passing a gas stream with particulates therein through the filter medium supported by the support member, wherein the filter medium traps the particulates and removes the particulates from the gas stream.

BRIEF DESCRIPTION OF THE DRAWINGS

The invention will be further described in connection with the accompanying drawings in which.

DESCRIPTION OF THE PREFERRED EMBODIMENTS

The filter media of the present invention are preferably comprised of glass. As used herein, the term "glass" includes glass, ceramic and glass-ceramic formulations including fibers made from minerals, such as rock. Preferably, conventional glass fibers are used, which may be one or more of many formulations well known in the art. The glass fibers may be woven or non-woven and may be prepared by any technique known in the art.

Any one of a number of suitable binders, or combinations thereof, may be used for the purposes of the present invention. However, the binder should be organic-inorganic or inorganic, in order to attain the optimal heat resistance. The binder typically is in the form of a sol-gel. A sol-gel form is generally one which converts a colloidal dispersion to a gel. Thus, the binder of the present invention typically comprises water glass, or a colloidal suspension of organic-inorganic or inorganic particles in water or an organic solvent, or a mixture of colloidal suspensions with water glass, or hydrolysis and condensation products, which ultimately form $SiO_2$, $Al_2O_3ZrO_2$, $TiO_2$, $SiO_2/TiO_2$, $SiO_2/ZrO_2$, $B_2O_3/SiO_2$, $Na_2O/B_2O_3/SiO_2$ or $Na_2O/Al_2O_3/B_2O_3/SiO_2$ composites.

In a preferred embodiment of the present invention, the filter medium has a weight of from about 100 $g/m^2$ to about 2000 $g/m^2$.

In general, the filter bag of the present invention is used with a support member on which the filter bag is supported facing an opening through a cell plate in a baghouse. The support member includes a generally tubular support frame, which is affixed to the cell plate for supporting the filter bag. It is preferred that the support frame be configured to provide a tight fit with the filter bag, in order to reduce the potentially detrimental flexing that can occur during the filtration and reverse-purge cleaning cycles to which the bag will be subjected.

One such support frame is described in a copending, commonly-assigned application, application Ser. No. 09/061,242, filed concurrently herewith by Käppeler et al., entitled "Adjustable Filter Bag Retainer," and incorporated by reference herein in its entirety. The support frame described therein includes a longitudinal gap extending along its entire length. In order to provide a tight fit between the filter bag and the frame, a mechanism is provided for spreading open the gap in order to expand the frame transversely.

Figure 1:
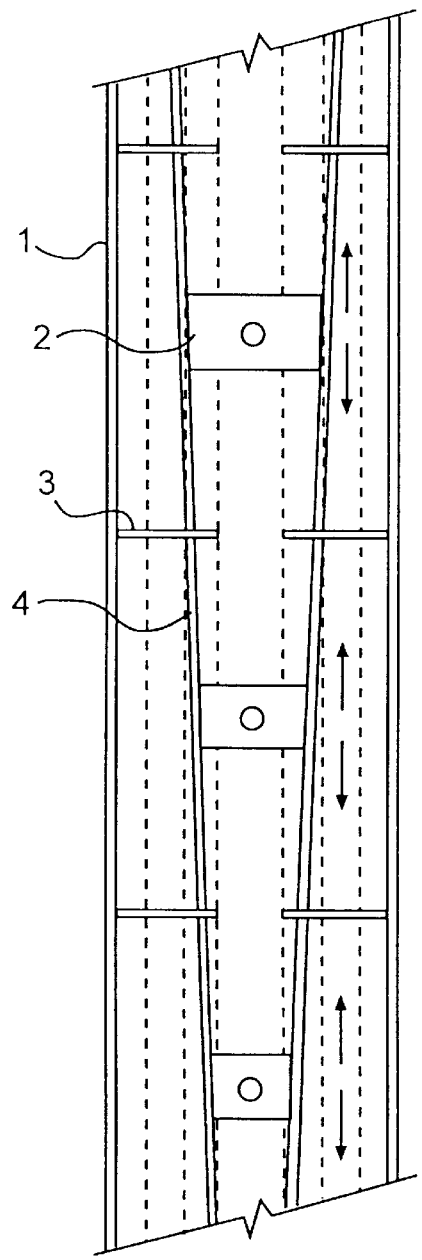
FIG. 1 is a schematic, front view of the filter and internal support of the present invention.
Figure 2:
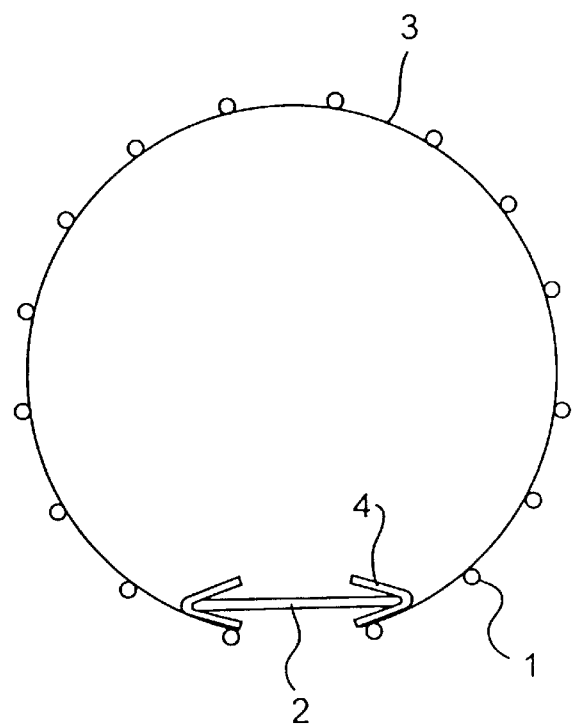
FIG. 2 is a schematic, top view of the filter and internal support of the present invention.

FIGS. 1 and 2 schematically illustrate such a support member, which is made up of a matrix of peripheral rings 3 affixed to substantially longitudinal beams 1. Each of the rings 3 has a disjunction, and the disjunctions of the rings 3 are oriented transversely between an adjacent pair of the beams 1, creating a longitudinal gap in the frame. In order to provide a close fit with the filter bag (not shown), the frame can be expanded transversely. This is done by a mechanism that selectively spreads the rings 3 open. In order to accomplish this, a pair of rails 4 is affixed to the frame on opposite sides of the gap. A spacer 2 slidably engages each of the rails 4. The spacer 2 biases the rails apart, and the peripheral rings 3 are held slightly open due to the presence of the spacer 2. The rails are non-parallel, and the spacer maintains its shape as it slides. Thus, as illustrated schematically in FIGS. 1 and 2, sliding the spacer 2 up and down the rails (i.e., in the directions indicated by arrows) will alternately force the rails 4 apart causing the rings 3 to open so as to expand the frame transversely, and permit the rings 3 to relax inwardly to allow the frame to contract.

The frame is preferably formed of heavy wire. The beams 1, of which there are preferably 10 to 25 disposed around the perimeter of the frame, are typically formed of a 3 mm wire. The supporting rings should be spaced between about 100 and about 400 mm apart along the length of the frame. In the illustrated frame, sixteen longitudinal beams 1 are spot welded around the periphery of eleven peripheral rings 3, which are spaced approximately 200 mm apart. The rails 4 can be affixed to the inside of the rings 3, by means of spot welding or the like. As discussed, the rails are not parallel in this frame, but are disposed at a slight angle with respect to each other. This angle should be less than about 5 degrees, preferably in the approximate range of about 3 to about 5 degrees.

As can be seen in FIG. 2, the rails are generally concave and face one another. The opposing surfaces of the rails provide a seat in which the spacer 2 can fit. In the illustrated embodiment, the rails are substantially U-shaped. However, the rails can take another suitable shape, such as V- or C-shaped, and can be angled or arcuate.

Depending upon the stiffness of the various materials used for the spacer and the peripheral rings 3, it is preferred that approximately two to ten spacers 2 be disposed along the length of the frame.

Suitable alternate designs for the support member are also discussed in the above-referenced copending application.

The filter medium is coated with the organic-inorganic or inorganic binder. The binder may be applied by any suitable method, including dipping, rolling or spraying.

The resulting filter element is non-self-supporting. Thus, the support member is inserted into the filter element. Preferably, the support member is adjustable in order to provide a close fit between the filter element and the support. Any deformation or movement caused by suction or reverse jet cleaning during the filtration process is thus eliminated, resulting in no breakage of the fixed fiber crossover points.

The examples which follow are intended as an illustration of certain preferred embodiments of the invention, and no limitation of the invention is implied.

EXAMPLE 1

Binder

Methyltriethoxysilane is mixed with tetraethoxysilane in molar ratios from 1:1 to 10:1. Then, water is added in molar ratios, water to hydrolyzable groups, from 1:0.1 to 1:4. Hydrolysis and condensation reactions are initiated by adding an acid, e.g., HCl, as a catalyst so that the pH of the solution is adjusted to 1. After reaction, the resulting coating solution can be used as prepared or diluted with an organic solvent such as ethanol or propanol.

EXAMPLE 2

Binder

Highly, dispersed fused silica is suspended in propanol with an ultrasonic disintegrator. The amount of fused silica is from 0.25% and 5% by weight. Another solution is prepared by hydrolysis and condensation of tetraethoxysilane (TEOS) with water, ethanol and HCl whereby the molar ratios of TEOS:water:ethanol:HCl vary from 1:0.5:0:0.01 and 1:8:10:0.1. Then, the suspension of the $SiO_2$-particles in propanol is mixed with the tetraethoxysilane solution in a volume ratio from 1:1 to 1:10.

EXAMPLE 3

Binder

Methyltriethoxysilane is mixed with tetraethoxysilane in molar ratios from 1:1 to 10:1. Then, water is added in molar ratios of water to hydrolyzable groups from 1:0.1 to 1:4. The water is introduced by a suspension of colloidal $SiO_2$-particles in water with a solids content of 30% by weight. Hydrolysis and condensation reactions are initiated by adding an acid, e.g., HCl, as a catalyst so that the pH of the solution is adjusted to 1. After the reaction occurs, the resulting coating solution can be used as prepared or diluted with an organic solvent such as ethanol or propanol.

EXAMPLE 4

Binder

Highly dispersed fused silica is suspended in distilled water with an ultrasonic disintegrator. The amount of fused silica is from 0.25% and 5% by weight. Then, water glass solution is added in a volume ratio of 1:1 and mixed for an additional 20 minutes.

EXAMPLE 5

Binder

Methyltriethoxysilane is mixed with tetraethoxysilane in molar ratios from 1:1 to 10:1. Then, water is added in molar ratios of water to hydrolyzable groups from 1:0.1 to 1:10. The water is introduced by a suspension of colloidal $ZrO_2$-particles in water with a solids content of 30% by weight. Hydrolysis and condensation reactions are initiated by adding acid, e.g., HCl, as a catalyst so that the pH of the solution is adjusted to 1. After the reaction occurs, the resulting coating solution can be used as prepared or diluted with an organic solvent, such as ethanol or propanol.

EXAMPLE 6

Binder

A colloidal suspension of $ZrO_2$-particles in water with a solids content of 30% by weight is mixed with water glass solution in volume ratios from 1:1 to 1:10.

EXAMPLE 7

Binder

A colloidal suspension of $Al_2O_3$-particles in water with a solids content of 20% by weight is mixed with water glass solution in volume ratios from 1:1 to 1:10.

While a preferred form of the invention has been shown in the drawings and described, since variations in the preferred form will be apparent to those skilled in the art, the invention should not be construed as limited to the specific form shown and described, but instead is as set forth in the following claims.

We claim:

1. A filtering apparatus, comprising:
   (a) a filter bag formed of a filter medium comprising glass fibers fixed to one another at crossover points by a ceramic binder coating; and
   (b) an adjustable bag retainer including,
      (i) a tubular support frame arranged within an interior of said filter bag for support of said filter bag by a periphery of said tubular support frame, said tubular support frame defining a longitudinal slot extending therealong; and
      (ii) a spacer wedged between and in engagement with said tubular support frame on opposite sides of said longitudinal slot, said spacer biasing said tubular support frame apart at said longitudinal slot and said periphery of said tubular support frame into abutting support with said interior of said filter bag such that the filter bag is firmly supported against movement.

2. The filtering apparatus of claim 1, wherein said glass fibers comprise a material selected from the group consisting of glass, ceramic, mineral, and a mixture thereof.

3. The filtering apparatus of claim 1, wherein said filter medium operates at a temperature of at least about 300° C.

4. The filtering apparatus of claim 1, wherein said filter medium weighs from about 100 $g/m^2$ to about 2000 $g/m^2$.

5. The filtering apparatus of claim 1, wherein said binder coating is an organic-inorganic or inorganic substance.

6. The filtering apparatus of claim 5, wherein said binder coating is selected from the group consisting of $SiO_2$, $Al_3O_3ZrO_2$, $TiO_2$, $SiO_2/TiO_2$, $SiO_2/ZrO_2$, $B_2O_3/SiO_2$, $Na_2O/B_2O_3/SiO_2$ and $Na_2O/Al_2O_3/B_2O_3/SiO_2$ composites.

7. The filtering apparatus of claim 1, wherein a composition is applied to said filter medium by dipping, rolling or spraying.

8. The filtering apparatus of claim 1, said spacer is located inside of said periphery of said tubular support frame.

9. The filtering apparatus of claim 1, wherein said tubular support frame further includes a pair of longitudinal rails each located on an opposite side of said longitudinal slot and extending therealong, said spacer being in a wedged position between and in engagement with said longitudinal rails for biasing of said tubular support frame apart at said longitudinal slot.

10. The filtering apparatus of claim 9, wherein said spacer longitudinally slides in said wedged position been and engaged with said longings rails.

11. The filtering apparatus of claim 9, wherein said spacer extends only between said longitudinal rails and frictionally engages opposing surfaces thereof for retention therebetween.

12. The filing apparatus of claim 9, wherein said longitudinal rails are non-parallel and said spacer slides between said rails longitudinally along said tubular support frame such that said longitudinal rails are further biased apart by said spacer.

13. The filtering apparats of claim 9, wherein said longitudinal rails are substantially linear and oriented at an angle relative to one another.

14. The filtering apparatus of claim 9, wherein said rails have opposing concave surfaces that are engaged by said spacer.

* * * * *